United States Patent
Gupta et al.

(10) Patent No.: US 11,799,822 B2
(45) Date of Patent: Oct. 24, 2023

(54) PROXYLESS NETWORK ADDRESS TRANSLATION WITH DYNAMIC PORT ALLOCATION

(71) Applicant: Google LLC, Mountain View, CA (US)

(72) Inventors: Mukta Gupta, Santa Clara, CA (US); Alok Kumar, Fremont, CA (US); Gargi Adhav, San Jose, CA (US); Yuquan Jiang, San Jose, CA (US); Aakash Bhushan Arora, Newark, CA (US); Shijeesh Nharappadath Sankaranathan, Sunnyvale, CA (US); Marco Leogrande, Redwood City, CA (US); Salomon Sonny Ben-Shimon, Tel-Aviv (IL)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/581,357

(22) Filed: Jan. 21, 2022

(65) Prior Publication Data
US 2023/0239266 A1    Jul. 27, 2023

(51) Int. Cl.
*H04L 61/256*    (2022.01)
*G06F 9/455*    (2018.01)
(Continued)

(52) U.S. Cl.
CPC ........ *H04L 61/256* (2013.01); *G06F 9/45558* (2013.01); *H04L 61/2517* (2013.01);
(Continued)

(58) Field of Classification Search
CPC .............. H04L 61/256; H04L 61/5007; H04L 61/2517; G06F 9/45558; G06F 2009/4557; G06F 2009/45595
See application file for complete search history.

(56) References Cited

U.S. PATENT DOCUMENTS 7,437,474 B2    10/2008    Iyer et al.
8,289,968 B1 *    10/2012    Zhuang ............... H04L 61/2539
                                                                          370/252
(Continued)

FOREIGN PATENT DOCUMENTS

EP    2683138 A1    1/2014

OTHER PUBLICATIONS

Straub, "Design and Implementation of Patterns for Distributing Virtual Network Functions", University of Stuttgart, Sep. 6, 2018.*

(Continued)

*Primary Examiner* — Todd L Barker
(74) *Attorney, Agent, or Firm* — Lerner David LLP (57) ABSTRACT

Aspects of the disclosure provide for a proxyless NAT infrastructure with dynamic port allocation. A proxyless NAT infrastructure is configured to perform NAT between a network of virtual machines (VMs) and a device external to the network, without a device, such as a NAT server or a router, acting as a proxy. A system can include a control plane for provisioning VMs of a network, including configuring each VM to perform NAT and initially assigning a number of ports for communicating with other devices. The control plane maintains a feedback loop-receiving data characterizing port usage and network traffic at ports allocated to the various VMs and scaling the port allocation for each VM based on the received data. The control plane can allocate additional ports as determined to be needed by a VM, and later retrieve the ports to be reused for other VMs.

18 Claims, 8 Drawing Sheets

(51) Int. Cl.
*H04L 61/2517* (2022.01)
*H04L 61/5007* (2022.01)

(52) U.S. Cl.
CPC .. *H04L 61/5007* (2022.05); *G06F 2009/4557* (2013.01); *G06F 2009/45595* (2013.01)

(56) References Cited

U.S. PATENT DOCUMENTS

| | | | | |
|---|---|---|---|---|
| 8,447,851 | B1* | 5/2013 | Anderson | G06F 11/3089 709/224 |
| 9,055,117 | B1* | 6/2015 | Dickinson | H04L 61/2557 |
| 10,768,920 | B2* | 9/2020 | Fontoura | G06F 8/65 |
| 2012/0063458 | A1 | 3/2012 | Klink et al. | |
| 2013/0041987 | A1 | 2/2013 | Warno | |
| 2013/0185404 | A1* | 7/2013 | Patel | H04L 61/2514 709/222 |
| 2014/0007097 | A1* | 1/2014 | Chin | G06F 9/5077 718/1 |
| 2019/0173888 | A1 | 6/2019 | Li et al. | |
| 2019/0190885 | A1 | 6/2019 | Krug et al. | |
| 2019/0273812 | A1* | 9/2019 | Kucera | H04L 69/08 |
| 2021/0352044 | A1 | 11/2021 | Asveren et al. | |
| 2022/0191168 | A1* | 6/2022 | Snehashis | H04L 41/22 |

OTHER PUBLICATIONS

Perreault et al., "RFC 7659: Deifnintrions of Managed Objects for Network Address Translator (NATs)", Oct. 2015.*

Buzachis et al.."Towards Osmotic Computing: Analyzing Overlay Network Solutions to Optimize the Deployment of Container-Based Microservices inf Fog, Edge, and IoT Environments", 2018 IEEE 2nd International Conference on Fog and Edge Computing, May 1, 2018, IEEE Publlishing.*

Chen et al., "Docker-Enabled Build and Execution Environment (BEEE): an Encapsulated Envrionment Enabling HPC Applications Running Everywhere", 2018 International Conference on Bidg Data, Dec. 19, 2017, pp. 1737-1746.*

Huawei, "ME60 V800R010C10SPC500 Feature Description—NAT and IPv6 Transition 01", [online] [retrieved Jan. 21, 2022]. Retrieved from the Internet: https://support.huawei.com/enterprise/en/doc/EDOC1100059461/c90e512f/nat-port-allocation, 3 pages.

Cloud NAT, [online] [retrieved Jan. 21, 2022]. Retrieved from the Internet: https://cloud.google.com/nat/docs/release-notes, 4 pages.

Bush et al. The Address plus Port (A+P) Approach to the IPv4 Address Shortage; rfc6346.txt. Aug. 26, 2011. Internet Engineering Task Force, Ietf; Standard, Internet Society (Isoc) 4, Rue Des Falaises CH-1205 Geneva, Switzerland, pp. 1-38.

International Search Report and Written Opinion for PCT/US2022/038652 dated Sep. 28, 2022. 13 pages.

\* cited by examiner

PROXYLESS NETWORK ADDRESS TRANSLATION WITH DYNAMIC PORT ALLOCATION

BACKGROUND

Network address translation (NAT) is a protocol for network communication using a translation of publicly accessible external addresses from internal network-specific addresses. Each device of an internal network may be associated with a network address of an internal address space defining a range of potential addresses. These internal addresses may be invalid for use outside of the network, where network addresses of a different address space are used, such as public addresses assigned using Internal Protocol Version 4 (IPv4).

A device configured for NAT can act as a proxy between the internal network and devices external to the network and can translate internal network addresses for the devices into external network addresses. Devices external to the network communicate with devices internal to the network, using the external network address translated by the proxy.

NAT may also be implemented without a proxy. NAT implemented without a proxy includes initializing virtual machines in the internal network with a fixed number of ports of network communication. Multiple ports allow for multiple simultaneous connections between an internal network device and an external device.

BRIEF SUMMARY

Aspects of the disclosure provide for a proxyless NAT system with dynamic port allocation. A proxyless NAT system is configured to perform NAT between a network of virtual machines (VMs) and a device external to the network, without a device, such as a NAT server or a router, acting as a proxy. A system can include a control plane for initializing VMs of a network, including configuring each VM to perform NAT and initially assigning a number of ports for communicating with other devices. The control plane maintains a feedback loop-receiving data characterizing port usage and network traffic at ports allocated to the various VMs and scaling the port allocation for each VM based on the received data. The control plane can allocate additional ports as determined to be needed by a VM, and later retrieve the ports to be reused for other VMs. A VM can perform NAT to communicate with devices external to the network of the VM, using the scaled port allocation provided by the control plane.

Aspects of the disclosure include a system including one or more processors, the one or more processors configured to: receive port usage data for a virtual machine in a network, the virtual machine allocated with one or more ports and configured to perform network address translation from a respective internal network address for each port to an external network address associated with the one or more ports; determine, based on the port usage data, whether to scale the one or more ports; and in response to the determination to scale the one or more ports, add to or remove from the one or more ports.

Aspects of the disclosure include a method performed by one or more processors, the method including receiving, by the one or more processors, port usage data for a virtual machine in a network, the virtual machine allocated with one or more ports and configured to perform network address translation from a respective internal network address for each port to an external network address associated with the one or more ports; determining, by one or more processors and based on the port usage data, whether to scale the one or more ports; and in response to the determination to scale the one or more ports, adding to or removing from the one or more ports.

Aspects of the disclosure include one or more non-transitory computer readable storage media storing instructions that when executed by one or more processors cause the one or more processors to perform operations including: receiving port usage data for a virtual machine in a network, the virtual machine allocated with one or more ports and configured to perform network address translation from a respective internal network address for each port to an external network address associated with the one or more ports; determining based on the port usage data, whether to scale the one or more ports; and in response to the determination to scale the one or more ports, adding to or removing from the one or more ports.

The system, method, and/or one or more non-transitory computer readable storage media can include one or more optional features. In some examples, aspects of the disclosure provide for all of the following features, in combination.

The virtual machine is one of a plurality of virtual machines configured to perform network address translation to one or more external network addresses associated with one or more respective ports allocated to each virtual machine, and wherein the port usage data includes data from the plurality of virtual machines.

The one or more processors are further configured to initialize the virtual machine, wherein in initializing the virtual machine, the one or more processors are configured to: allocate the one or more ports to the virtual machine and configure the virtual machine to send data generated by the virtual machine and requested by a computing device external to the network, using the external network address.

The virtual machine is further configured by the one or more processors to receive data from an external computing device and perform network address translation to translate the external network address to an internal network address of a port of the one or more ports.

The virtual machine performs the network address translation without a proxy computing device.

The virtual machine is a first virtual machine, and the one or more processors are further configured to: remove a port from the first virtual machine, and add, based on the port usage data, the removed port to a second virtual machine in the network, the second virtual machine different from the first virtual machine.

In determining, based on the port usage data, whether to scale the one or more ports, the one or more processors are configured to: receive one or more of: a minimum port value specifying a minimum number of ports to allocate to the virtual machine, a maximum port value specifying a maximum number of ports to allocate to the virtual machine, a water mark value specifying a threshold ratio of ports in use over a number of ports allocated to the virtual machine; and determine whether to scale the one or more ports based at least on one or more of the minimum port value, the maximum port value, and the water mark value.

In receiving the port usage data, the one or more processors are configured to: receive port usage data when the port usage data meets one or more predetermined criteria, the predetermined criteria including one or more of: the number of ports allocated to the virtual machine is less than the maximum port value, the number of ports allocated to the virtual machine is greater than the minimum port value, and a usage ratio representing the ratio of ports in use versus the number of ports allocated to the virtual machine meets the water mark value.

The one or more processors are further configured to: allocate a plurality of ports to the virtual machine, the plurality of ports including the one or more ports; and implement a control plane including one or more shards, each shard configured to perform the receiving, determining, and adding to or removing from of ports within a respective range of ports of the plurality of ports allocated to the virtual machine, each port in the respective range corresponding to a respective external network address.

In performing the receiving, determining, and adding or removing of ports, each shard is further configured to: receive, from the port usage data, at least a portion of the port usage data corresponding to ports within the respective range of ports corresponding to the shard; determine, for each external network address and based on the port usage data, whether to scale the ports within the respective range of ports corresponding to the external network address; and in response to the determination to scale the ports for each external network address and based on the port usage, add to or remove from the ports corresponding to the external network address.

The one or more processors are further configured to: migrate the virtual machine from a first computing device in the network, to a second computing device in the network, wherein, while migrating the virtual machine, the one or more processors are configured to: determine whether received port usage data includes at least a portion of port usage data from the virtual machine while hosted on the first computing device; and in response to the determining that the received includes the portion of port usage data from the virtual machine while hosted on the first computing device, discard the portion of port usage data.

DETAILED DESCRIPTION

Overview

Aspects of the disclosure provide for a proxyless NAT system with dynamic port allocation. A proxyless NAT system can manage one or more NAT gateways in software for translating internal network addresses to an external network address, such as an IPv4 address. Instead of statically allocating ports to each virtual machine of a host device for communicating with a device external to the network of the host device, the system as described herein implements a control plane that can dynamically scale the number of ports allocated to each virtual machine individually configured to perform NAT.

In contrast to a proxy-based system, in a proxyless NAT system individual VMs of an internal network—such as an internal network for an organization or enterprise—perform their own NAT, subject to rules defined by the gateway the VM is behind. When the VM is initialized, a control plane of the system can provide an initial allocation of ports with which the VM communicates with external devices—such as devices that are not part of the VM's internal network. The VM uses the ports, NAT, and NAT rules associated with the gateway, to communicate with an external device.

Unlike a proxy-based NAT system, a proxyless system lacks an intermediary device, such as a router or VM, configured to act as an in-between in translating internal network addresses for an internal network of devices to an external network address usable outside of the network. An example of an external network address is an IPv4 address. In a proxy-based NAT system, the router performing NAT for the network can also be responsible for allocating ports to the various devices of the internal network. However, the proxy represents a bottleneck, as each device communicating outside of the network must pass its data through the proxy first.

A proxyless NAT system as described herein can receive port usage data characterizing port usage for different virtual machines. Port usage data can include measurements or other information characterizing, for example, data passing to and from ports allocated to a VM, or a number of active ports in use versus the total number of ports allocated to the VM. Using the port usage data, the control plane can determine whether a current allocation of ports to a virtual machine should be scaled by adding or removing ports. For example, the control plane may scale port allocation by adding additional ports in response to determining, from the port usage data, that packets are dropping from the virtual machine to an external device. As another example, the control plane may scale port allocation in response to determining, from the port usage data, that allocated ports to the virtual machine are not being used.

Aspects of the disclosure provide for a number of technical advantages. Rather than requiring a minimum number of ports to be allocated statically when a virtual machine is deployed on a host device, a proxyless NAT system as described herein can dynamically allocate ports based on a feedback loop of port usage data and dynamic re-allocation of the various virtual machines based on the feedback. The system can be implemented to provide for dynamic port allocation, without introducing a proxy that may bottleneck internal-to-external network communication.

Dynamic port allocation for proxyless NAT infrastructure allows more VMs to be supported by the same NAT gateway. Statically allocating a minimum number of ports fixes the number of VMs supported by the same NAT gateway. For example, if each VM is set to have a minimum of 64 ports, and 64612 ports are available by NAT gateway, then the NAT gateway can support up to 1008 VMs (64612/64).

Dynamic port allocation can be adjusted per user input, further improving the flexibility of providing ports as needed, to reduce computing resources, measured for example in processor cycles or memory bandwidth, wasted on unused but allocated ports. Further, user input for provisioning an exact number of ports per virtual machine is not needed, as aspects of the disclosure provide for dynamically allocating ports based on received feedback. A source of user error in underestimating or overestimating port demand for virtual machines can be reduced or eliminated.

Aspects of the disclosure also provide for supporting divergent workloads behind a NAT gateway. Different VM workloads may communicate with different external devices and/or according to different NAT rules. A system as described herein can dynamically allocate ports on a per-gateway, per-VM, and per-rule basis, introducing a degree of control to improve both large and small traffic flow. VM workloads need not be homogenized with an assumption that their external network access demands are the same.

For example, VMs behind the same gateway may have example workloads imposing different demands on network traffic. For example, in the case of downloading periodic updates, fewer active ports are generally needed than a VM in continuous communication with a downstream provider. Instead of having to group different VMs according to workload-type in networks behind different gateways, dynamic port allocation can be applied per-VM, allowing for different workloads with different port allocation requirements to operate efficiently within the same network. Further, a system as described herein can dynamically adjust port allocation on a per-NAT rule basis. NAT rules can be established specifying specific external network addresses to be used under certain conditions specified by the rules.

The same VM can handle multiple workloads with varying degrees of traffic activity, characterized by traffic "burstiness" or volumes that may or may not be periodic in occurrence. A user can specify a single external address—for example as part of the NAT gateway—and the system can automatically adjust port allocation to maintain execution of workloads on the VM, without user adjustment in response to varying network traffic patterns.

In some examples, different VMs managed by a common organization may be deployed on the behalf of different users of the organization. Some users may be administrators responsible for managing the NAT gateway for an organization's network, while others may be responsible for managing services or applications running on different VMs in that network. With dynamic port allocation according to aspects of the disclosure, the communication of how many ports are required for each VM between VM users and NAT gateway administrators beforehand is not needed.

Example Systems

Figure 1:
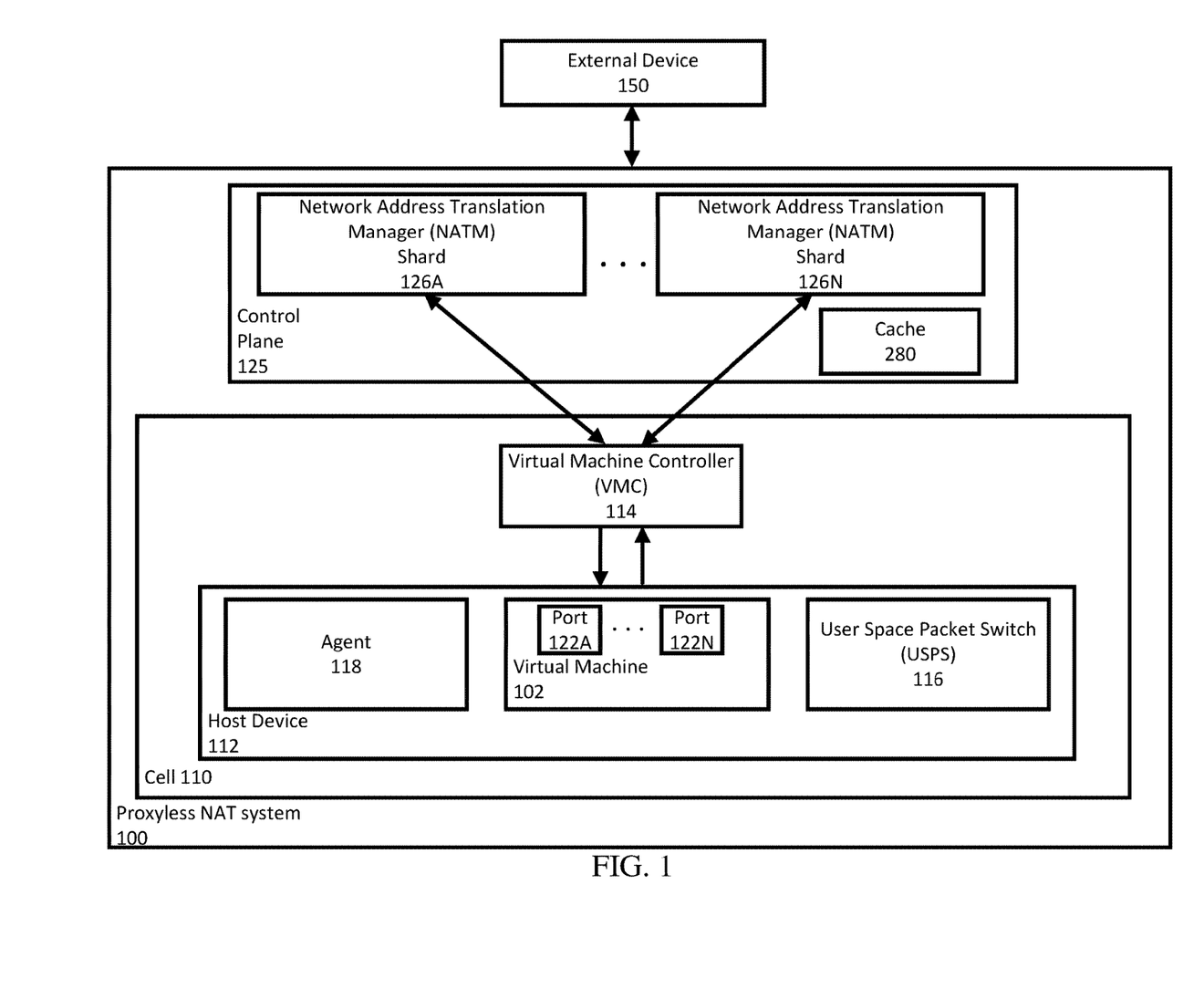
FIG. 1 is a block diagram of an example proxyless NAT system with dynamic port allocation.

FIG. 1 is a block diagram of an example proxyless NAT system 100 with dynamic port allocation, according to aspects of the disclosure. The system 100 can include a control plane 125 and a cell 110 of host devices, including host device 112. Host device 112 can be any of a variety of computing devices configured to run one or more VMs, such as VM 102. The cell 110 represents a logical or physical collection of computing devices. The cell 110 can be one of multiple cells of computing devices, for example as part of a computing platform. Different cells can be implemented in different physical regions and may be configured to communicate with the control plane 125 for performing dynamic port allocation, as described herein.

A host device 112 can implement an agent 118 for interacting with a virtual machine controller (VMC) 114 and a user space packet switch 116 (USPS) for reporting port usage statistics to and from the VM 102 to the VMC 114. The VMC 114, USPS 116, and agent 118 can be implemented according to any combination of hardware, firmware, and software for performing the operations described herein. The VMC 114 can be implemented on the same or different computing device as the VM 102. Although shown as part of the same cell 110, the VMC 114 can be implemented on a computing device physically or logically separate from the host device 112 and other devices of the cell 110.

The VM 102 can run a number of applications (not shown) and can interact with an external device 150. To do so, the virtual machine 102 may be allocated with a number of ports 122A-N for establishing connections between the virtual machine 102 and the external device 150. The external device 150 can be external to the system 100, as shown in FIG. 1. As with the host device 112, the external device 150 can be any of a variety of different computing devices, such as a server, a personal computing device, a mobile device, virtual machine, etc. From the perspective of the external device 150, the virtual machine has an external network address, such as an IPv4 address.

Figure 2:
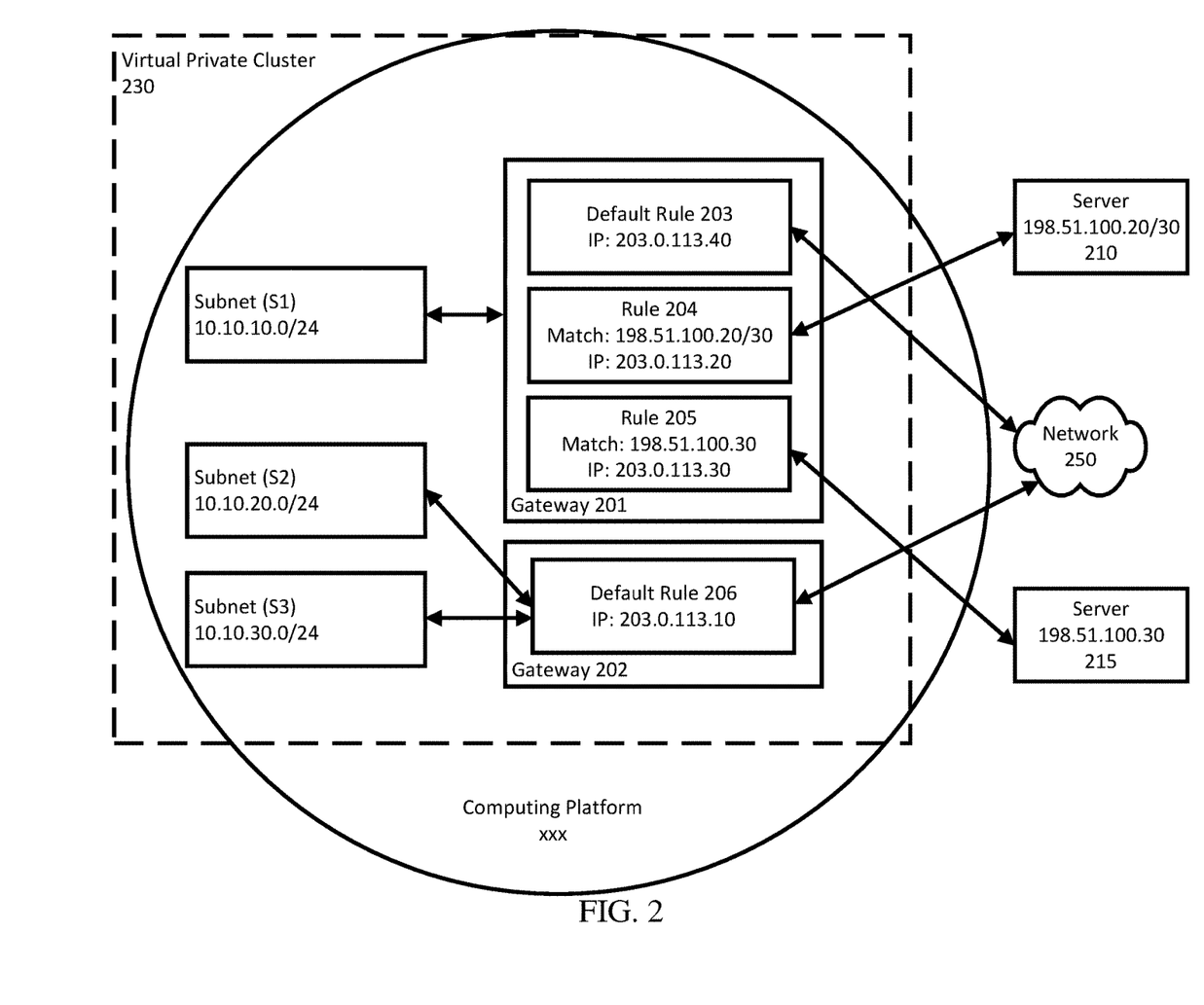
FIG. 2 is a block diagram of NAT gateways configured with NAT rules and dynamic port allocation, according to aspects of the disclosure.

The control plane can configure the VM 102 to perform NAT according to one or more rules of a NAT gateway, described herein with reference to FIG. 2. The VM 102 is provided information for performing NAT, for example by receiving NAT rules for translating an internal network address corresponding to the VM 102, with an external network address, such as an IPv4 address. The exact external network address can depend on rules provided as part of the NAT gateway the VM is behind. Further, the ports 122A-122N of the VM 102 may be assigned to communicate with different devices. The VM 102 can receive from the VMC 114, instructions for modifying the port allocation, to improve port utilization, for example by adding or removing ports to and from the VM 102 to provide the VM 102 with the ports to meet its network communication demand, while reducing the number of unused ports.

The USPS 116 can monitor usage of the ports 122A-122N of the VM 102 and report back port usage data to the agent 118. Port usage data can include, for example, information about the availability of each port of the VM 102 to accept incoming data, dropped packets as a result of unavailable ports 122A-122N, volume and/or burstiness of inbound or outbound traffic, measured for example in megabytes per second or megabytes over a predetermined period of time, etc. In different examples, port usage data can be provided as reports at different levels of granularity. For instance, the USPS 116 can report port usage data per endpoint per NAT gateway and/or per NAT rule. The USPS 116 can also track port usage data for data incoming from the external device 150. For example, the USPS 116 can track port usage per external destination port and per protocol, such as Transmission Control Protocol (TCP), User Datagram Protocol (UDP), or Internet Control Message Protocol (ICMP). Gateways, rules, and virtual machines can be specified in the port usage data with identifiers, such as hash values.

The agent 118 for the host device 112 can pass the port usage data to the VMC 114. The VMC 114 can pass the port usage data to an instance of a NAT manager (NATM) shard running on the control plane 125. Each NATM shard 126A-N can be a shard running concurrently with one or more other shards.

A NATM shard can be configured to perform dynamic port allocation, for example for a predetermined range of ports available to VMs in a given cell. The control plane 125 can execute a number of NATM shards for scaling up and down dynamic port allocation, for example with the number of cells of VMs running proxyless NAT. Operations described as performed by the control plane 125 can also be performed by a NATM shard.

The control plane 125 can be implemented on one or more devices or VMs, physically or logically separate from the devices or VMs of a cell. As described herein, the control plane 125 may be configured to perform a variety of operations related to initializing VMs for proxyless NAT, receiving port usage data, and allocating or reallocating ports for each VM based on the port usage data. The control plane 125, however, does not receive the network traffic between the VMs implementing proxyless NAT, and external devices. This is at least because NAT is handled by each VM for their respective communications with external devices requiring an external network address.

The initial port allocation can be predetermined, or user defined. For example, in the absence of user input, the control plane 125 can allocate 64 or 1024 ports to the VM 102, as example defaults. The control plane can receive and pass the initial port allocation to the VMC 114, which may be configured to cause the VM 102 to communicate information through ports specified by the initial port allocation. Later updates to the port allocation as determined by the control plane in response to the received port usage data can be similarly provided to the VMC 114, completing the feedback loop of port usage data and updated port allocations in response to the data.

The control plane 125 can also receive a range of values for how many ports the VM 102 can have allocated to it at a given time. The range can be defined by a maximum port value or a minimum port value, which can be user-defined or predetermined automatically. The minimum port value represents the least number of connections a VM is guaranteed to have on one external device. The minimum value can be, as a non-limiting example, a power of 2 between 32 and 32768 but must be less than a received maximum value. The maximum port value is the maximum number of connections a VM is permitted to make to a single external device. As a non-limiting example, the maximum value can be a power of 2 between 64 and 65536 but must be greater than a received minimum port value. Different VMs or devices in the cell 110 may have different maximum or minimum port values. In other examples, other minimum or maximum values can be used, including values that are not a power of 2.

As another example, the control plane 125 can receive user input specifying that each VM has at least 1024 ports at all times, even if the ports are not being used for an active connection at all times. The control plane 125 may also receive a maximum port value as user input, for example 4090. If the control plane 125 does not receive user input for the maximum port value, a default value can be assigned, for example 65536.

In some examples, default maximum and/or minimum port values can be dynamically calculated based on past user input, and/or other traffic or usage data. For example, the control plane 125 may set a default value based on previous minimum port values or maximum port values provided in the past as user input. In other examples, the control plane 125 may set a default value for the maximum or minimum port values that is higher or lower with respect to previous network traffic or port usage data indicating higher or lower network activity and port usage, respectively.

In some examples, the control plane 125 can also receive a water mark value, such as a high water mark value and/or a low water mark value. A water mark value is a threshold ratio between 0 and 1 of ports in use by the VM over the number of allocated ports to the VM. The high and low water mark values can be received as predetermined input, similar to the maximum and minimum port values. A water mark value can be predetermined. In other examples, the water mark value can be provided by a user to the control plane, for example to indicate a preferred ratio for port allocation. The control plane can use the water mark value in determining whether to scale port allocation to the corresponding VM. An example of a high water mark value can be 0.8 or 80 percent. An example low water mark value can be 0.3 or 30 percent.

The control plane 125 can determine whether to scale the port allocation for each VM based on received port usage data. For example, if a VM is close to using all of the ports, for example 80% usage of all assigned ports, currently allocated to it, the control plane 125 can allocate additional ports, up to the maximum port value for the VM. As another example, if the VM port usage drops significantly, for example below 30% of all assigned ports, then the control plane 125 can deallocate ports, for example by causing some ports to be drained and freed, down to the minimum port value for the VM.

Upon determining to scale the port allocation, a NATM shard can send modification instructions to the port allocation to the VMC 114 for assigning, draining, or freeing a number of allocated ports. The number of ports added or removed by the NATM shard can vary from implementation-to-implementation. For example, the NATM shard may double or halve the number of allocated ports when allocating or deallocating ports, respectively. If doubling or halving would cause the number of allocated ports to go above or below the maximum or minimum port value for the VM, the NATM shard can instead add or remove ports up to the maximum or minimum port value, respectively.

Figure 4A:
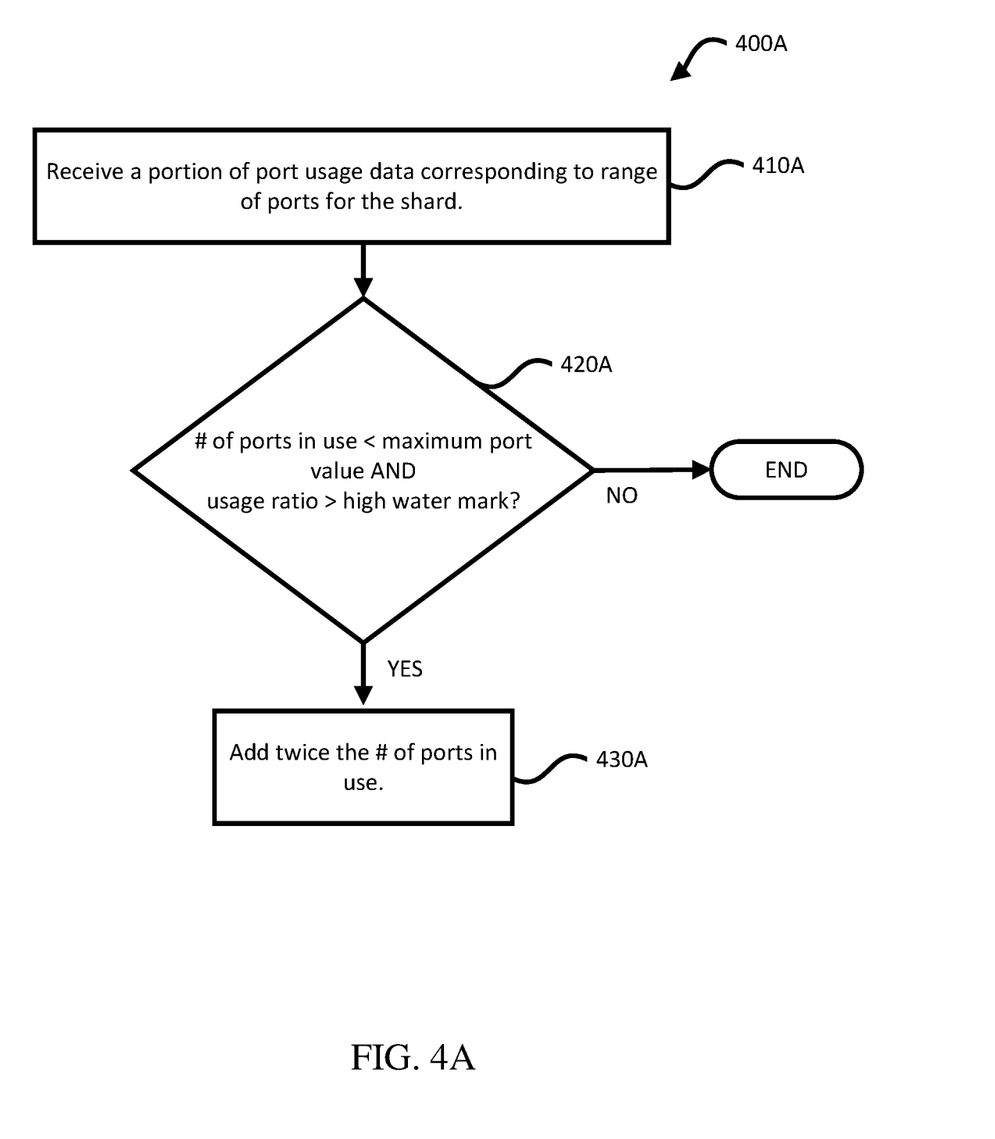
FIG. 4A is a flowchart of an example process for adding additional ports based on a determination to scale port allocation for a VM.
Figure 4B:
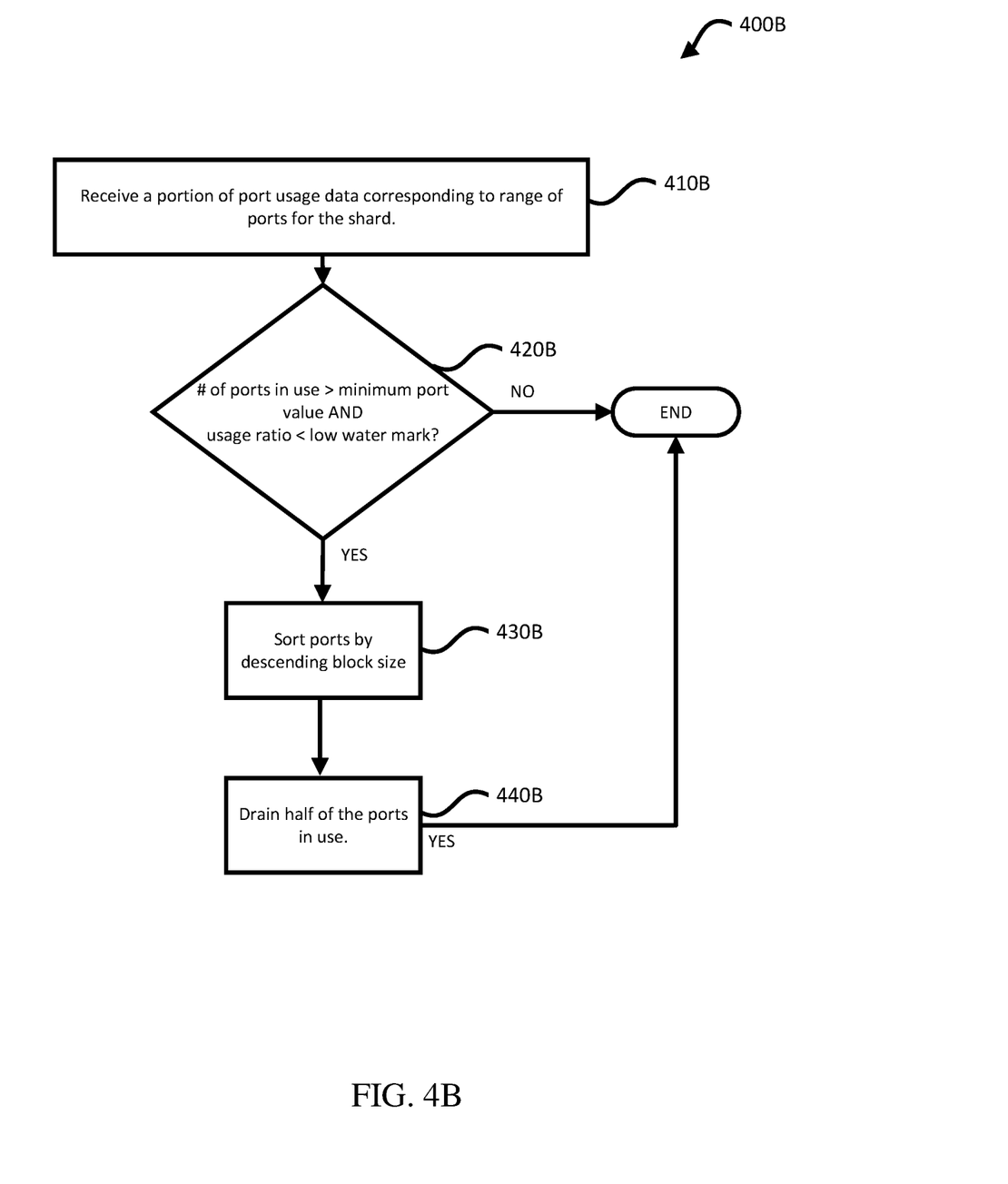
FIG. 4B is a flowchart of an example process for removing ports based on a determination to scale port allocation for a VM.

The NATM shard may determine to scale up port allocation when port usage for a VM is higher than the high water mark value but less than the maximum port value. As another example, the NATM shard may determine to scale down port allocation when port usage decreases. FIGS. 4A-B and their corresponding description, herein, provide additional examples of how port allocation may be scaled up or down.

Ports that are freed from one VM may be added to another VM determined to require port scaling. If the control plane determines that scaling up port allocation is needed, but also that the VM 102 is already allocated at its maximum port value, the control plane 125 can send an indication in the form of a message or prompt to request an increased port allocation. The indication can include a flag representing port allocation failure, which may be consumed by a downstream process involved, for example, in port quota management with a user of a computing platform implementing the system 100.

In some examples, the agent 118 reports port usage data to the VMC 114 only in response to predetermined criteria being met. For example, the agent 118 may report port usage data in response to determining from the port usage data that the total number of allocated ports in use by the VM meets a predetermined threshold. An example process for reporting port usage data is described herein with reference to FIG. 5. In some examples, the agent 118 handles the determination of port allocation, and sends the control plane 125 port usage data only when scaling is determined to be necessary.

The agent 118 can periodically check the port usage data, for example according to the process 500 (FIG. 5) to determine whether or not to report the data to the control plane. As described herein, in some examples the control plane 125 can include a cache 280 for caching reported port usage data. In other examples, the control plane 125 follows a "fire-and-forget," in which port usage data is reported and acted on as it is received by the control plane 125. The cache 280 can store port usage data that may otherwise be dropped when a fire-and-forget model is applied.

The control plane 125 may verify port usage data received from the agent 118 prior to processing the data and determining whether to scale ports allocated to a virtual machine whose ports are represented in the data. The control plane 125 can verify port usage data as it is received, or by retrieving it from the cache 280 where it may be stored for processing at a later time. One benefit of verifying the port usage data is mitigating or eliminating reports with numerical inconsistencies or reports made with stale parameters, such as outdated values for the maximum port value, minimum port value, high water mark value, or low water mark value for a VM whose ports are represented in the data.

For example, the control plane 125 may reject the port usage data received from the VMC 114 if the number of ports in use reported is greater than the number of total active ports recorded by the control plane 125. As another example, the control plane 125 may reject the port usage data if the block size extracted from ports in use does not equal the block size for the number of total ports in use recorded by the control plane 125. As another example, the control plane 125 may reject the port usage data if the block size extracted from ports in use by the VM does not match the block size of the ports known to be in use by the control plane 125. The latter example may occur, for example, as a result of receiving a stale report from the VMC 114.

The system 100 can implement an Application Programming Interface (API) or an extension of an API for configuring proxyless NAT. The API can define a POST request for generating a new NAT gateway, optionally including parameters specifying a project identifier and/or a region for the NAT gateway to be based in. The POST request can also specify whether dynamic port allocation is enabled, the maximum or minimum values defining a range of ports allocated to a VM, and/or NAT rules to apply as part of the gateway. The API can also define PATCH and GET requests for updating a NAT gateway or receiving parameter data from the NAT gateway.

Migration of virtual machines may occur from one host device to another. The migration can move from one cell to another cell in the same physical region, or from one host device to another host device within the same cell. During the migration, the USPS 116 of the host device 112 for the virtual machine 102 being migrated stops sending port usage data to the control plane 125. The virtual machine may be marked as a "migration source," indicating the source location of an ongoing migration. The virtual machine created at the destination of the migration may be marked by the system 100 as the "migration target."

If migration occurs on host devices in different cells, then there may be two VMCs reporting port usage data to the control plane 125 from the same virtual machine at the same time—the migration source and the migration target. Port usage data can be timestamped before being sent to the control plane 125. The control plane 125 can use the timestamp to determine which report is from the migration target, and discard port usage data from the migration source.

If migration occurs on the same cell, then the same VMC will report port usage data for both the migration source and the migration target. The new agent for the destination host device will take over port reporting, thus leaving no impact from the old agent to the control plane.

FIG. 2 is a block diagram of NAT gateways 201, 202 configured with NAT rules 203-206 and dynamic port allocation, according to aspects of the disclosure. The NAT gateways 201, 202 represent the external network address virtual machines or devices from within subnets S1-S3 translate internal network addresses from to communicate with external devices, such as servers 210, 215, or network 250. A virtual private cloud (VPC) 230 may be a collection of host devices on a computing platform 270, allocated for example to a user or organization of the platform 270. In some examples, the host devices may be part of the cloud computing platform 270.

VPC 230 can be divided into a number of subnets, including subnets S1-S3, representing subsets of host devices of the VPC 230. Subnets S1-S3 can be organized logically and/or physically, for example according to devices or virtual machines performing a common workload. A subnet can be associated with an internal network address range, for example 10.10.10.0/24 for subnet S1, 10.10.20.0/24 for subnet S2, and 10.10.30.0/24 for subnet S3.

NAT rules provide for configuring predefined external network addresses only for certain destinations that need allow listing, while using another larger set of addresses for other destinations. For example, rule 204 causes a VM in the subnet S1 to translate an internal network address to an external network address of 203.0.113.20 for communicating with server 210 having a network address range of 198.51.100.20/30. As another example, rule 205 causes a VM in the subnet S1 to translate an internal network address to an external network address of 203.0.113.20 for communicating with the server 215 having a network address of 198.51.100.30. In these examples, the servers 210, 215 may be part of a network, accessible to the subnet S1.

Gateway 201 also defines a default rule 203 for translating an internal network address from a VM of subnet S1 to an external network address of 203.0.113.40 when rules 204, 205 are not applicable. For subnets S2 and S3, gateway 202 defines only a default rule 206 for communicating with the network 250, (for example, on the Internet), with an external network address of 203.0.113.10.

The proxyless NAT system 100 as described herein can receive port usage data as separate reports for ports used for communicating according to a NAT rule. In turn, the control plane can determine whether to scale port allocation for a VM on a per-NAT rule basis. For example, the system 100 may scale VMs in the subnet S1 by adding ports for communicating with the server 210 under rule 204 but remove ports for communicating with the network 250 in accordance with the default rule 203. As another example, the NAT system 100 may determine to scale port allocation for subnet S2 when communicating in accordance with the default rule 206 but determine not to scale port allocation for subnet S3.

In some examples, the system 100 can operate in one of multiple different modes—such as what is referred to as a "manual mode" and an "automatic mode," described presently. In manual mode, the system 100 receives external network addresses reserved by users. The reserved addresses may be used for the NAT gateways 201-202. In automatic mode, the control plane 125 reserves external network addresses automatically, as required. For example, the system 100 may receive a request to launch a new project on the platform, and the control plane, as part of configuring the project, may automatically reserve an external address for a corresponding NAT gateway. Whether the system 100 is operating in manual mode or automatic mode, the system 100 can provide a user-configurable option to enable or disable dynamic port allocation. As part of receiving input to enable dynamic port allocation, the system 100 can prompt the user to specify maximum and minimum port values.

Example Methods

Figure 3:
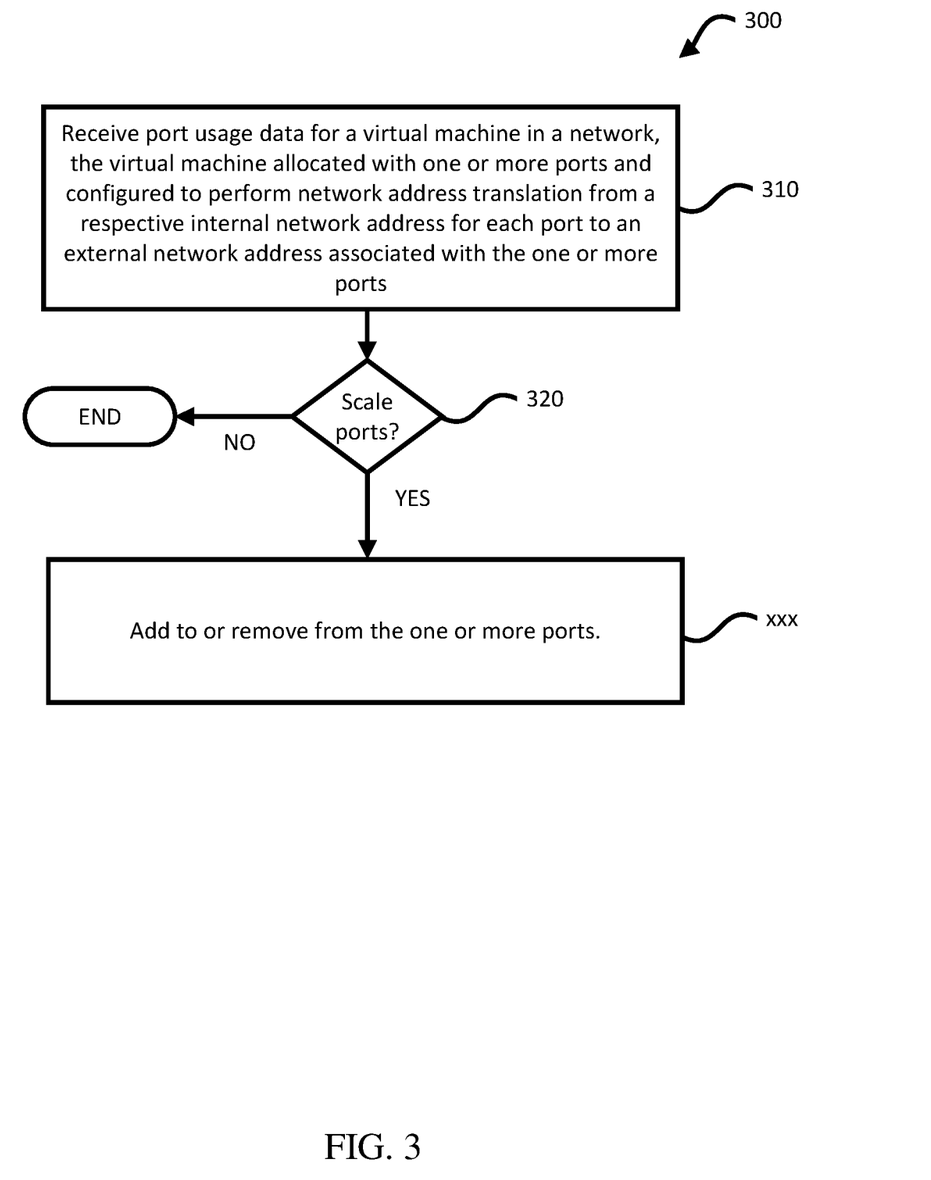
FIG. 3 is a flow diagram of an example process for dynamic port allocation of a proxyless NAT system.

FIG. 3 is a flow diagram of an example process 300 for dynamic port allocation of a proxyless NAT system. For example, the process 300 can be performed by one or more processors implementing a control plane of a proxyless NAT system.

The control plane receives port usage data for a virtual machine in a network, according to block 310. The virtual machine is allocated with one or more ports and configured to perform network address translation from a respective internal network address for each port to an external network address associated with the one or more ports. The control plane can be configured to initialize the virtual machine to perform NAT, including providing the virtual machine with default and user-specified rules, such as the NAT rules described herein with reference to FIG. 2.

The control plane determines whether port allocation needs to be scaled for the VM, according to decision block 320. If so, ("YES"), the control plane adds to or removes from the one or more ports allocated to the VM. Otherwise ("NO"), the process ends. As described herein with reference to FIG. 1, the determination to scale port allocation can be based on one or more of the maximum port values, minimum port value, high water mark value, and/or low water mark value. As part of making the determination, the control plane can receive port usage reports as part of the port usage data, for port communication between a VM and an external device, according to a NAT rule. As described with reference to FIG. 2, the determination by the control plane for scaling port allocation can be on a per-rule basis.

Figure 5:
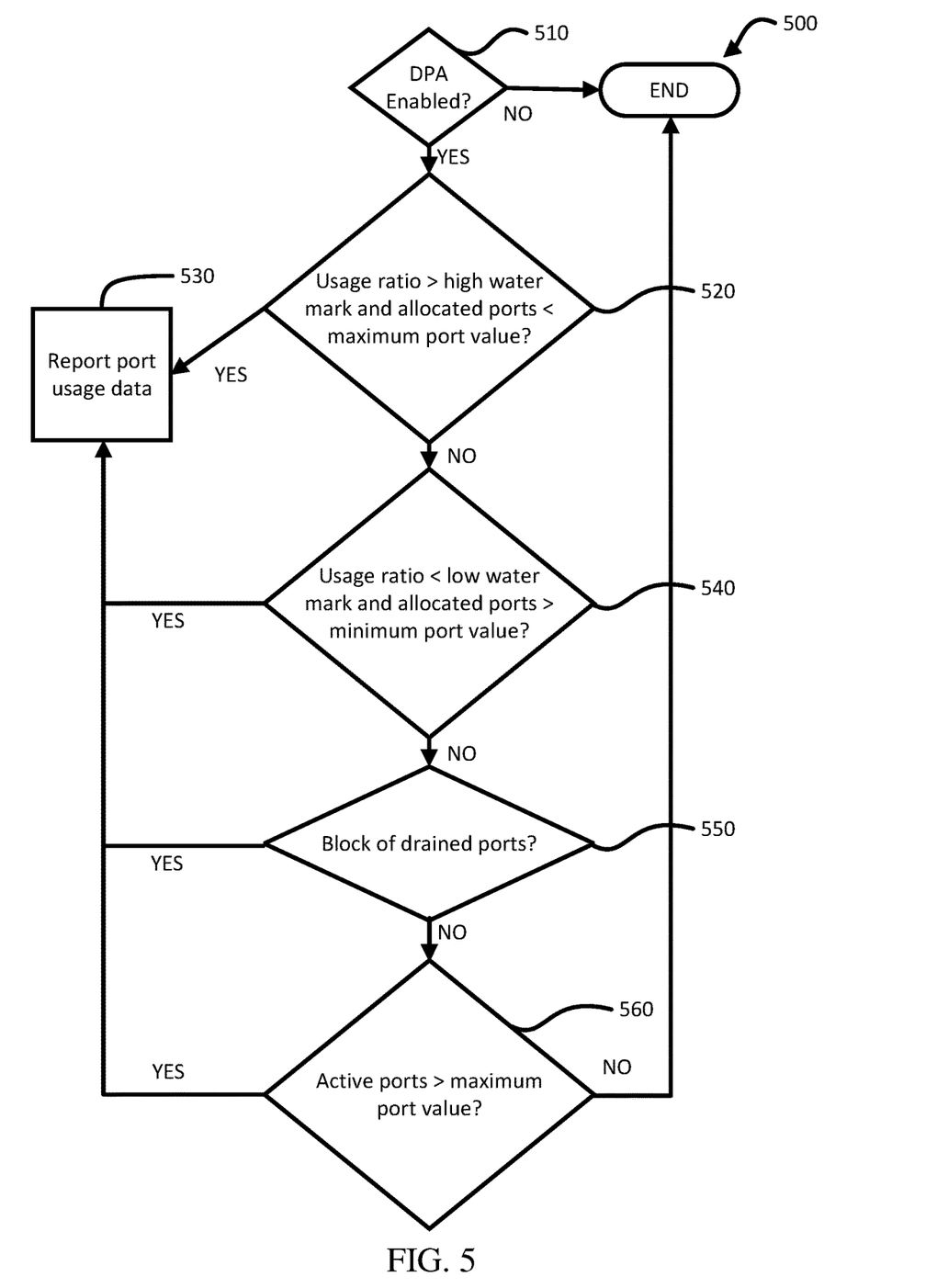
FIG. 5 is a flowchart of an example process for reporting port usage data.

In some examples, the VMC for a host device communicating with the control plane determines whether to send port usage data, in accordance with reference to FIG. 5. In some examples, the control plane only receives port usage data when port allocation scaling is required.

FIG. 4A is a flowchart of an example process 400A for adding additional ports based on a determination to scale port allocation for a VM. The process 400A can be performed by a NATM shard, for example a NATM shard as described and shown with reference to FIG. 1. The process 400A can be performed per rule of a gateway a VM is behind. In other words, the process 400A may cause the NATM shard to issue modifications to the port allocation of the VM for communicating according to some, but not all, NAT rules for a gateway.

The NATM shard receives at least a portion of port usage data corresponding to a port range assigned to the NATM shard by the control plane, according to block 410A. Dynamic port allocation can be distributed by the control plane across multiple shards.

The NATM shard determines that the number of ports in use by the VM is less than the maximum port number, and the usage ratio of ports in use over the number of ports allocated to the VM is greater than a high water mark value, according to decision block 420A. If the determination in decision block 420A is negative ("NO"), the process 400A may end.

If the determination from decision block 420A is positive ("YES"), then the NATM shard causes double the number of ports to be allocated to the VM for the rule, according to block 430A. In causing ports to be added to the VM, the NATM shard can send instructions to the VMC responsible for the VM, to cause the VM to be reconfigured to add the additional ports. In some examples, instead of doubling the number of allocated ports relative to the number of ports in use, the NATM shard can cause a different number of ports to be added, for example 1.5, 3, or 4 times the current number of ports in use, or a fixed value of additional ports, such as x additional ports.

Figure 4C:
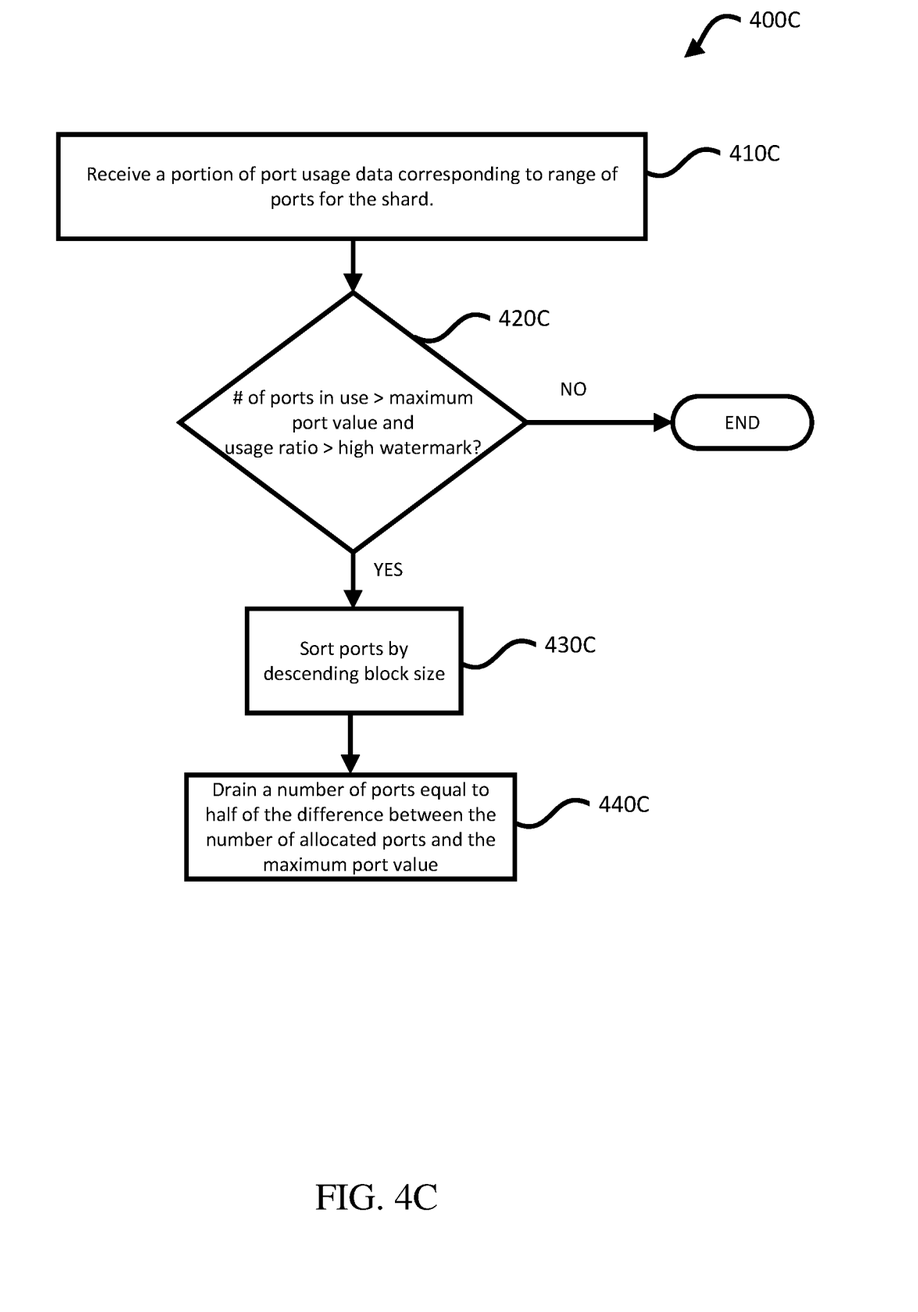
FIG. 4C is a flowchart of another example process for removing ports based on a determination to scale port allocation for a VM.

FIGS. 4B-C are flowcharts of example processes for removing ports from a port allocation. In some examples, a NATM shard is configured to perform the processes 400B-C, together. In other examples, the NATM shard performs the process 400B, the process 400C, or a combination of the two.

FIG. 4B is a flowchart of an example process 400B for removing ports based on a determination to scale port allocation for a VM.

A NATM shard receives at least a portion of port usage data corresponding to a port range assigned to the NATM shard by the control plane, according to block 410B.

The NATM shard determines whether the number of ports in use for the VM for a given rule is greater than the minimum port value for the VM, and that the number of ports in use for the VM is less than a low water mark value, according to decision block 420B.

In response to a positive determination ("YES") of the decision block 420B, the NATM shard sorts the ports in use by block size, according to block 430B. Ports for the VM may be allocated by the proxyless NAT system in blocks of ports, The size of the blocks can vary from implementation-to-implementation. Prior to freeing a port from use, the port is drained, before the port can be freed and reused for another VM. The ports can be marked as drained, indicating to the USPS not to use those ports for a new connection. When existing connections are closed, the USPS can report to the NATM shard that these drained ports are no longer in use. Then, the NATM shard can remove those free drained ports to be used elsewhere. A block of ports is considered completely free if all of the ports within the block are free. Sorting the ports by block allows larger ports to be removed before smaller ports.

According to block 440B, the NATM shard drains half of the number of ports in use by the VM. In other examples, other numbers of ports can be removed.

FIG. 4C is a flowchart of another example process 400C for removing ports based on a determination to scale port allocation for a VM A NATM shard receives at least a portion of port usage data corresponding to a port range assigned to the NATM shard by the control plane, according to block 410C.

The NATM shard determines whether the number of allocated ports is greater than maximum port value and usage ratio is higher than the high water mark value, according to block 420C. If the determination in decision block 420C is positive ("YES"), then the NATM shard sorts the ports by descending block size order, according to block 430C. Otherwise, ("NO") the process ends.

According to block 440C, the NATM drains a number of ports equal to half of the difference between the number of allocated ports and the maximum port value. In other examples, a fixed number of ports can be drained. In other examples, other numbers of ports can be drained.

FIG. 5 is a flowchart of an example process 500 for reporting port usage data. As described herein with reference to FIG. 1, an agent 118 for a host device 112 can report port usage data to a NATM shard, subject to one or more predetermined criteria. The process 500 (FIG. 5) is an example of different criteria imposed on the agent, although it is understood that in different examples more, fewer, or different criteria may be imposed, or applied in a different order.

By configuring the agent to report port usage data subject to one or more predetermined criteria, the system can reduce network traffic otherwise incurred as a result of periodic or unfiltered reporting. The reduction can be particularly significant if the need to scale the number of ports allocated to the VM is infrequent.

According to decision block 510 of the process 500, the agent determines whether dynamic port allocation is currently enabled. Dynamic port allocation can be disabled or enabled, for example according to user input. If dynamic port allocation is not enabled ("NO") the process 500 ends.

According to decision block 520, the agent determines whether the usage ratio of ports in use for a VM is above a predetermined high water mark value and whether the number of allocated ports in use is less than the maximum port value for a given NAT rule and NAT gateway. The given NAT rule and gateway may be specified in the port usage data. If the agent makes a positive determination in decision block 520 ("YES"), the agent reports the port usage data according to block 530.

The agent determines whether the usage ratio of ports in use for the VM is below the low water mark value and whether the number of allocated ports in use is greater than the minimum port value for a given NAT rule and NAT gateway, according to decision block 540. In some examples, the operation represented by decision block 540 is skipped if a low water mark value is not provided. If the agent makes a positive determination in decision block 540 ("YES"), the agent reports the port usage data according to block 530.

The agent determines whether a block of drained ports is completely free, according to decision block 550. If the agent makes a positive determination in decision block 550 ("YES"), the agent reports the port usage data according to block 530.

The agent determines whether the number of allocated ports in use is greater than the maximum port value, according to decision block 560. If the agent makes a positive determination in decision block 560 ("YES"), the agent reports the port usage data according to block 530. If none of the predetermined criteria are met as in blocks 510, 520, 540-560, then the process 500 ends.

Example Computing Environments

Figure 6:
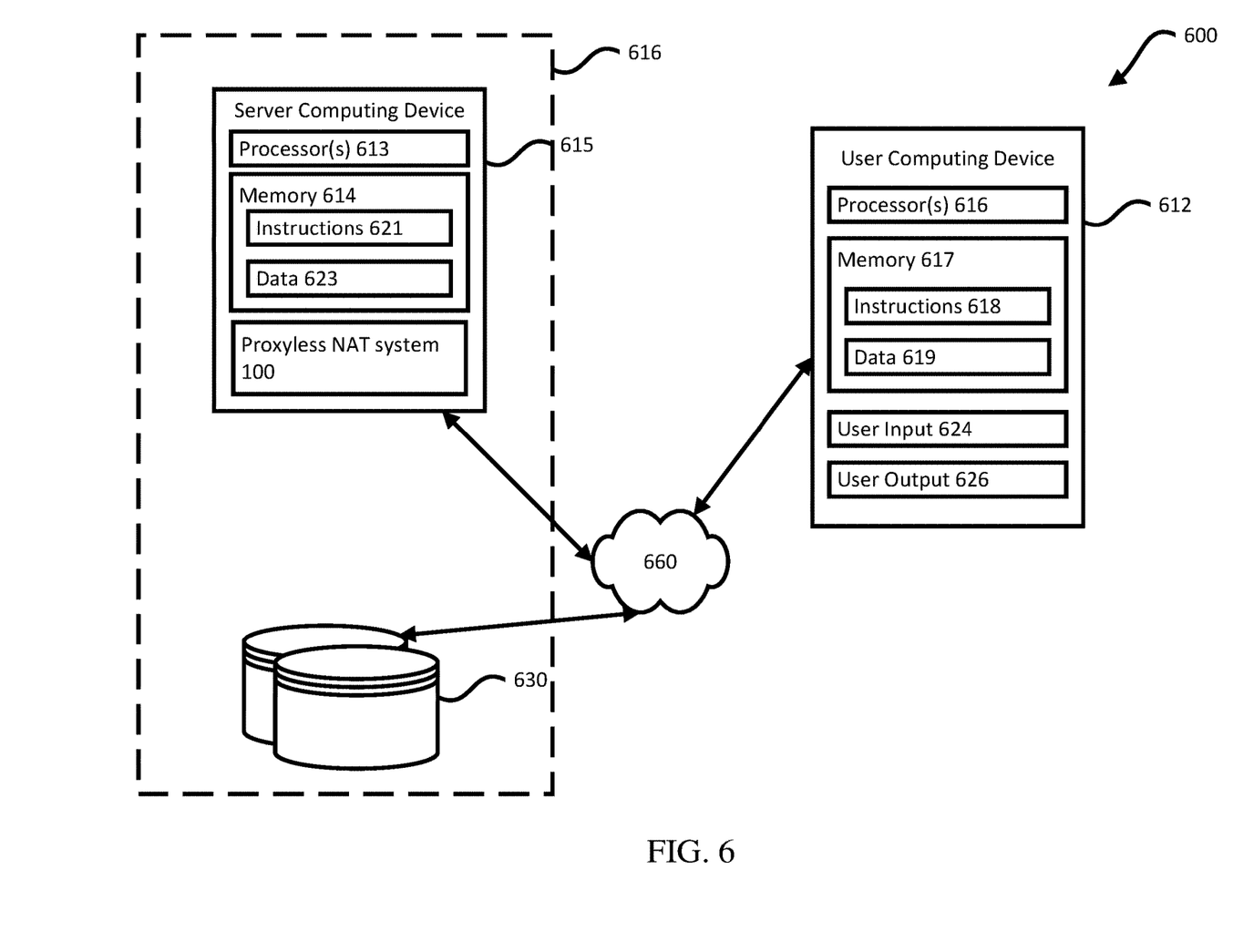
FIG. 6 is a block diagram of an example environment for implementing the proxyless NAT system with dynamic port allocation.

FIG. 6 is a block diagram of an example environment 600 for implementing the proxyless NAT system 100 with dynamic port allocation. The system 100 can be implemented on one or more devices having one or more processors in one or more locations, such as in server computing device 615. User computing device 612 and the server computing device 615 can be communicatively coupled to one or more storage devices 630 over a network 660. The storage device(s) 630 can be a combination of volatile and non-volatile memory and can be at the same or different physical locations than the computing devices 612, 615. For example, the storage device(s) 630 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 615 can include one or more processors 613 and memory 614. The memory 614 can store information accessible by the processor(s) 613, including instructions 621 that can be executed by the processor(s) 613. The memory 614 can also include data 623 that can be retrieved, manipulated, or stored by the processor(s) 613. The memory 614 can be a type of non-transitory computer readable medium capable of storing information accessible by the processor(s) 613, such as volatile and non-volatile memory. The processor(s) 613 can include one or more central processing units (CPUs), graphic processing units (GPUs), field-programmable gate arrays (FPGAs), and/or application-specific integrated circuits (ASICs), such as tensor processing units (TPUs).

The instructions 621 can include one or more instructions that when executed by the processor(s) 613, causes the one or more processors to perform actions defined by the instructions. The instructions 621 can be stored in object code format for direct processing by the processor(s) 613, or in other formats including interpretable scripts or collections of independent source code modules that are interpreted on demand or compiled in advance. The instructions 621 can include instructions for implementing the system 100 consistent with aspects of this disclosure. The system 100 can be executed using the processor(s) 613, and/or using other processors remotely located from the server computing device 615.

The data 623 can be retrieved, stored, or modified by the processor(s) 613 in accordance with the instructions 621. The data 623 can be stored in computer registers, in a relational or non-relational database as a table having a plurality of different fields and records, or as JSON, YAML, proto, or XML documents. The data 623 can also be formatted in a computer-readable format such as, but not limited to, binary values, ASCII, or Unicode. Moreover, the data 623 can include information sufficient to identify relevant information, such as numbers, descriptive text, proprietary codes, pointers, references to data stored in other memories, including other network locations, or information that is used by a function to calculate relevant data.

The user computing device 612 can also be configured similarly to the server computing device 615, with one or more processors 616, memory 617, instructions 618, and data 619. The user computing device 612 can also include a user output 626, and a user input 624. The user input 624 can include any appropriate mechanism or technique for receiving input from a user, such as keyboard, mouse, mechanical actuators, soft actuators, touchscreens, microphones, and sensors.

The server computing device 615 can be configured to transmit data to the user computing device 612, and the user computing device 612 can be configured to display at least a portion of the received data on a display implemented as part of the user output 626. The user output 626 can also be used for displaying an interface between the user computing device 612 and the server computing device 615. The user output 626 can alternatively or additionally include one or more speakers, transducers or other audio outputs, a haptic interface or other tactile feedback that provides non-visual and non-audible information to the platform user of the user computing device 612.

Although FIG. 6 illustrates the processors 613, 616 and the memories 614, 617 as being within the computing devices 615, 612, components described in this specification, including the processors 613, 616 and the memories 614, 617 can include multiple processors and memories that can operate in different physical locations and not within the same computing device. For example, some of the instructions 621, 618 and the data 623, 619 can be stored on a removable SD card and others within a read-only computer chip. Some or all of the instructions and data can be stored in a location physically remote from, yet still accessible by, the processors 613, 616. Similarly, the processors 613, 616 can include a collection of processors that can perform concurrent and/or sequential operation. The computing devices 615, 612 can each include one or more internal clocks providing timing information, which can be used for time measurement for operations and programs run by the computing devices 615, 612.

The server computing device 615 can be configured to receive requests to process data from the user computing device 612. For example, the environment 500 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 612 may receive and transmit data specifying target computing resources to be allocated for executing a neural network trained to perform a particular neural network task.

The devices 612, 615 can be capable of direct and indirect communication over the network 660. The devices 615, 612 can set up listening sockets that may accept an initiating connection for sending and receiving information. The network 660 itself can include various configurations and protocols including the Internet, World Wide Web, intranets, virtual private networks, wide area networks, local networks, and private networks using communication protocols proprietary to one or more companies. The network 660 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 660, in addition or alternatively, can also support wired connections between the devices 612, 615, including over various types of Ethernet connection.

Although a single server computing device 615, user computing device 612, and datacenter 550 are shown in FIG. 6, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

With respect to the use of substantially any plural and/or singular terms herein, for example (with the term "element" being a stand-in for any system, component, data, etc.) "an/the element," "one or more elements," "multiple elements," a "plurality of elements," "at least one element," etc., those having skill in the art can translate from the plural to the singular and/or from the singular to the plural as is appropriate to the context and/or application described. The various singular/plural permutations may be expressly set forth herein, for sake of clarity and without limitation unless expressly indicated.

The invention claimed is:

1. A system comprising one or more processors, the one or more processors configured to:
   receive port usage data for a virtual machine in a first network, the virtual machine allocated with one or more ports and configured to perform network address translation from a respective internal network address for each port to an external network address associated with the one or more ports, the internal network address corresponding to the first network, the external network address corresponding to a second network external to the first network, and the virtual machine being configured to perform the network address translation without a network address translator between the virtual machine and the second network;
   determine, based on the port usage data, whether to scale the one or more ports; and
   in response to the determination to scale the one or more ports, add to or remove from the one or more ports.

2. The system of claim 1,
   wherein the virtual machine is one of a plurality of virtual machines configured to perform network address translation to one or more external network addresses associated with one or more respective ports allocated to each virtual machine, and wherein the port usage data comprises data from the plurality of virtual machines.

3. The system of claim 1, wherein the one or more processors are further configured to
initialize the virtual machine, wherein in initializing the virtual machine, the one or more processors are configured to:
allocate the one or more ports to the virtual machine, and
configure the virtual machine to send data generated by the virtual machine and requested by a computing device external to the first network, using the external network address.

4. The system of claim 3, the virtual machine is further configured by the one or more processors to receive data from an external computing device and perform network address translation to translate the external network address to an internal network address of a port of the one or more ports.

5. The system of claim 1,
wherein the virtual machine is a first virtual machine, and
wherein the one or more processors are further configured to:
remove a port from the first virtual machine, and
add, based on the port usage data, the removed port to a second virtual machine in the first network, the second virtual machine different from the first virtual machine.

6. The system of claim 1, wherein in determining, based on the port usage data, whether to scale the one or more ports, the one or more processors are configured to:
receive one or more of:
a minimum port value specifying a minimum number of ports to allocate to the virtual machine,
a maximum port value specifying a maximum number of ports to allocate to the virtual machine,
a water mark value specifying a threshold ratio of ports in use over a number of ports allocated to the virtual machine; and
determine whether to scale the one or more ports based at least on one or more of the minimum port value, the maximum port value, and the water mark value.

7. The system of claim 6, wherein in receiving the port usage data, the one or more processors are configured to:
receive port usage data when the port usage data meets one or more predetermined criteria, the predetermined criteria comprising one or more of:
the number of ports allocated to the virtual machine is less than the maximum port value,
the number of ports allocated to the virtual machine is greater than the minimum port value, and
a usage ratio representing the ratio of ports in use versus the number of ports allocated to the virtual machine meets the water mark value.

8. The system of claim 1, wherein the one or more processors are further configured to:
allocate a plurality of usable ports to the virtual machine, the plurality of usable ports including the one or more ports; and
implement a control plane comprising one or more shards, each shard configured to perform the receiving, determining, and adding to or removing from of ports within a respective range of ports of the plurality of usable ports allocated to the virtual machine, each port in the respective range corresponding to a respective external network address.

9. The system of claim 8, wherein in performing the receiving, determining, and adding or removing of ports, each shard is further configured to:
receive, from the port usage data, at least a portion of the port usage data corresponding to ports within the respective range of ports corresponding to the shard;
determine, for each external network address and based on the port usage data, whether to scale the ports within the respective range of ports corresponding to the external network address; and
in response to the determination to scale the ports for each external network address and based on the port usage, add to or remove from the ports corresponding to the external network address.

10. The system of claim 1, wherein the one or more processors are further configured to:
migrate the virtual machine from a first computing device in the first network, to a second computing device in the first network, wherein, while migrating the virtual machine, the one or more processors are configured to:
determine whether the received port usage data comprises at least a portion of port usage data from the virtual machine while hosted on the first computing device; and
in response to determining that the received port usage data comprises the portion of port usage data from the virtual machine while hosted on the first computing device, discard the portion of port usage data.

11. A method comprising:
receiving, by one or more processors, port usage data for a virtual machine in a first network, the virtual machine allocated with one or more ports and configured to perform network address translation from a respective internal network address for each port to an external network address associated with the one or more ports, the internal network address corresponding to the first network, the external network address corresponding to a second network external to the first network, and the virtual machine being configured to perform the network address translation without a network address translator between the virtual machine and the second network;
determining, by one or more processors and based on the port usage data, whether to scale the one or more ports; and
in response to the determination to scale the one or more ports, adding to or removing from the one or more ports.

12. The method of claim 11,
wherein the virtual machine is one of a plurality of virtual machines configured to perform network address translation to one or more external network addresses associated with one or more respective ports allocated to each virtual machine, and
wherein the port usage data comprises data from the plurality of virtual machines.

13. The method of claim 11, further comprising:
initializing, by the one or more processors, the virtual machine, comprising:
allocating the one or more ports to the virtual machine, and
configuring the virtual machine to send data generated by the virtual machine and requested by a computing device external to the first network, using the external network address.

14. The method of claim 13, wherein the virtual machine is further configured by the one or more processors to receive data from an external computing device and perform network address translation to translate the external network address to an internal network address of a port of the one or more ports.

15. The method of claim 11,
wherein the virtual machine is a first virtual machine, and
wherein the method further comprises:
removing, by the one or more processors, a port from the first virtual machine, and
adding, by the one or more processors and based on the port usage data, the removed port to a second virtual machine in the first network, the second virtual machine different from the first virtual machine.

16. The method of claim 11, wherein determining, based on the port usage data, whether to scale the one or more ports comprises:
receiving, by the one or more processors, one or more of:
a minimum port value specifying a minimum number of ports to allocate to the virtual machine,
a maximum port value specifying a maximum number of ports to allocate to the virtual machine,
a water mark value specifying a threshold ratio of ports in use over a number of ports allocated to the virtual machine; and
determining, by the one or more processors, whether to scale the one or more ports based at least on one or more of the minimum port value, the maximum port value, and the water mark value.

17. The method of claim 16, wherein receiving the port usage data comprises:
receiving port usage data when the port usage data meets one or more predetermined criteria, the predetermined criteria comprising one or more of:
the number of ports allocated to the virtual machine is less than the maximum port value,
the number of ports allocated to the virtual machine is greater than the minimum port value, and
a usage ratio representing the ratio of ports in use versus the number of ports allocated to the virtual machine meets the water mark value.

18. One or more non-transitory computer readable storage media storing instructions that when executed by one or more processors cause the one or more processors to perform operations comprising:
receiving port usage data for a virtual machine in a first network, the virtual machine allocated with one or more ports and configured to perform network address translation from a respective internal network address for each port to an external network address associated with the one or more ports, the internal network address corresponding to the first network, the external network address corresponding to a second network external to the first network, and the virtual machine being configured to perform the network address translation without a network address translator between the virtual machine and the second network;
determining based on the port usage data, whether to scale the one or more ports; and
in response to the determination to scale the one or more ports, adding to or removing from the one or more ports.

\* \* \* \* \*